United States Patent
Liu et al.

(10) Patent No.: US 12,299,320 B2
(45) Date of Patent: May 13, 2025

(54) DATA CACHING BASED ON DATA POPULARITY

(71) Applicant: Beijing Volcano Engine Technology Co., Ltd., Beijing (CN)

(72) Inventors: Xiao Liu, Los Angeles, CA (US); Haiyang Shi, Los Angeles, CA (US); Hao Wang, Los Angeles, CA (US)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/734,229

(22) Filed: Jun. 5, 2024

(65) Prior Publication Data
US 2024/0411478 A1    Dec. 12, 2024

(30) Foreign Application Priority Data

Jun. 6, 2023    (CN) .......................... 202310666532.8

(51) Int. Cl.
*G06F 3/06*    (2006.01)
(52) U.S. Cl.
CPC .......... *G06F 3/0655* (2013.01); *G06F 3/0604* (2013.01); *G06F 3/067* (2013.01)
(58) Field of Classification Search
CPC .................................................. G06F 3/0604
See application file for complete search history.

(56) References Cited

U.S. PATENT DOCUMENTS

| | | | |
|---|---|---|---|
| 6,324,620 B1 * | 11/2001 | Christenson | G06F 3/0653 711/112 |
| 10,387,340 B1 * | 8/2019 | Baryudin | G06F 3/0616 |
| 2013/0346672 A1 * | 12/2013 | Sengupta | G06F 12/0871 711/E12.024 |
| 2020/0272352 A1 * | 8/2020 | Zhang | G06F 3/0608 |
| 2022/0050722 A1 * | 2/2022 | Dugast | G06F 9/5016 |
| 2022/0382477 A1 * | 12/2022 | Wei | G06F 3/0611 |

FOREIGN PATENT DOCUMENTS

| | | |
|---|---|---|
| CN | 107179878 A | 9/2017 |
| JP | 4223729 B2 | 11/2008 |
| JP | 2011176595 A | 9/2011 |

OTHER PUBLICATIONS

European Patent Office, Extended European Search Report Issued in Application No. 24180027.5, Oct. 22, 2024, 12 pages.

\* cited by examiner

*Primary Examiner* — Hosain T Alam
*Assistant Examiner* — Nicholas A. Paperno
(74) *Attorney, Agent, or Firm* — Alleman Hall & Tuttle LLP

(57) ABSTRACT

A method, apparatus, electronic device and storage medium for data caching based on data popularity is provided. In the method, first access data transmitted by at least one client is received. The first access data represents an instruction log of a remote direct data read instruction transmitted by the client for target data cached in a non-uniform memory access structure. A data popularity of the target data is obtained based on the first access data. The data popularity represents a frequency of the target data accessed by the remote direct data read instruction. Based on the data popularity of the target data, the target data is cached to a target location in a data storage unit implemented based on the non-uniform memory access structure. Alternatively, the target data out of the data storage unit is migrated. The target location has a data read-write speed corresponding to the data popularity.

20 Claims, 7 Drawing Sheets

DATA CACHING BASED ON DATA POPULARITY

CROSS-REFERENCE TO RELATED APPLICATION

The present application claims priority to Chinese Patent Application No. 202310666532.8, filed on Jun. 6, 2023, and entitled "METHOD AND APPARATUS OF DATA PROCESSING, ELECTRONIC DEVICE AND STORAGE MEDIUM", which is incorporated herein by reference in its entirety.

FIELD

Embodiments of the present disclosure relate to the field of distributed storage technology, and in particular to a method and an apparatus of data processing, an electronic device and a storage medium.

BACKGROUND

A storage and computing separation architecture of a database solves a series of problems such as resource competition and high expansion cost by separating data processing and storage. It is currently a common distributed architecture. In order to further improve the performance of the database based on the storage and computing separation architecture, in the prior art, distributed cache nodes are set for the database to reduce the direct access to the database, thus reducing the network load and improving the performance of the database.

However, in a practical application, the prior art for caching data still suffers from the problem of an unreasonable data cache location, leading to an emergence of a cache data hotspot and affecting access efficiency and performance of the database.

SUMMARY

Embodiments of the present disclosure provide a method and an apparatus of data processing, an electronic device and a storage medium to solve the problem that the data cache location is unreasonable and affects the performance of the database.

In a first aspect, the embodiments of the present disclosure provide a method of data processing, including:
  receiving first access data transmitted by at least one client, the first access data representing an instruction log of a remote direct data read instruction transmitted by the client for target data cached in a non-uniform memory access structure; obtaining a data popularity of the target data based on the first access data, the data popularity representing a frequency of the target data accessed by the remote direct data read instruction; and based on the data popularity of the target data, caching the target data to a target location in a data storage unit implemented based on the non-uniform memory access structure, or migrating the target data out of the data storage unit, wherein the target location has a data read-write speed corresponding to the data popularity.

In a second aspect, the embodiments of the present disclosure provide an apparatus of data processing, including:
  a receiving module configured to receive first access data transmitted by at least one client, the first access data representing an instruction log of a remote direct data read instruction transmitted by the client for target data cached in a non-uniform memory access structure;
  a processing module configured to obtain a data popularity of the target data based on the first access data, the data popularity representing a frequency of the target data accessed by the remote direct data read instruction; and
  a caching module configured to, based on the data popularity of the target data, cache the target data to a target location in a data storage unit implemented based on the non-uniform memory access structure, or migrating the target data out of the data storage unit, wherein the target location has a data read-write speed corresponding to the data popularity.

In a third aspect, the embodiments of the present disclosure provide an electronic device, including: a processor, and a memory communicatively coupled to the processor;
  wherein the memory stores computer-executable instructions; and
  the processor executes the computer-executable instructions stored by the memory to carry out the method of data processing of the first aspect and various possible designs of the first aspect.

In a fourth aspect, the embodiments of the present disclosure provide a computer-readable storage medium having computer-executable instructions stored thereon, which, when executed by a processor, carry out the method of data processing of the first aspect and various possible designs of the first aspect.

In a fifth aspect, the embodiments of the present disclosure provide a computer program product including a computer program which, when executed by a processor, carries out the method of data processing of the first aspect and various possible designs of the first aspect.

The method and apparatus of data processing, the electronic device and the storage medium provided by an embodiment of the present disclosure, by receiving first access data transmitted by at least one client, the first access data representing an instruction log of a remote direct data read instruction transmitted by the client for target data cached in a non-uniform memory access structure; obtaining a data popularity of the target data based on the first access data, the data popularity representing a frequency of the target data accessed by the remote direct data read instruction; and based on the data popularity of the target data, caching the target data to a target location in a data storage unit implemented based on the non-uniform memory access structure, or migrating the target data out of the data storage unit, wherein the target location has a data read-write speed corresponding to the data popularity. The data popularity of the target data is determined by receiving the first access data transmitted by the client, and then targeted processing is carried out on the data popularity to cache it to the target location of the data storage unit whose read-write speed matches or migrate it out of the data storage unit, thereby improving the cache efficiency of the cache node for the target data, avoiding the formation of the cache hotspot, and thus improving the overall performance of the database.

BRIEF DESCRIPTION OF THE DRAWINGS

In order to more clearly illustrate the technical solutions in the embodiments of the present disclosure or in the prior art, the accompanying drawings required in the description of the embodiments or the prior art will be briefly introduced below. It is apparent to those of ordinary skill in the art that the drawings are some embodiments of the present disclo

DETAILED DESCRIPTION

In order to clarify the purpose, technical solution, and advantages of the embodiments of the present disclosure, the following will provide a clear and complete description of the technical solution in the embodiments of the present disclosure in conjunction with the accompanying drawings. Apparently, the described embodiments are a part of the embodiments of the present disclosure, not all of them. Based on the embodiments of the present disclosure, all other embodiments obtained by those of ordinary skill in the art without creative labor fall within the scope of protection of this disclosure.

It should be noted that the user information (including but not limited to user device information, user personal information, etc.) and data (including but not limited to data used for analysis, stored data, displayed data, etc.) involved in this disclosure are all information and data authorized by the user or fully authorized by all parties, and the collection, use, and processing of relevant data must comply with relevant laws, regulations, and standards of relevant countries and regions, and provide corresponding operation entrances for users to choose to authorize or refuse.

Figure 1:
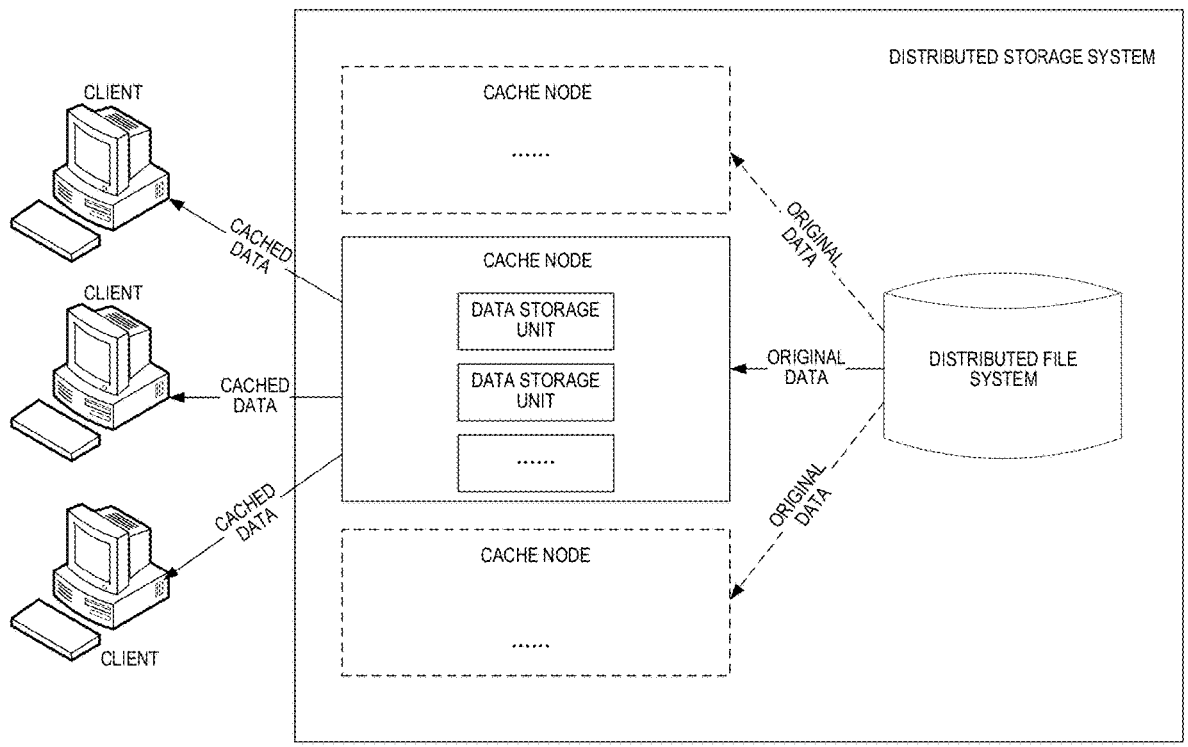
- FIG. 1 is an application scenario diagram of a method of data processing provided by an embodiment of the present disclosure.

Below is an explanation of the application scenario of the embodiments of the present disclosure:

FIG. 1 is an application scenario diagram of the method of data processing provided by an embodiment of the disclosure. The method of data processing provided by an embodiment of the present disclosure can be applied to the application scenario of data caching for a distributed storage system, and more specifically, to the application scenario of a distributed data caching realized based on Remote Direct Memory Access (RDMA). Specifically, the method provided by an embodiment of the present disclosure can be applied to a cache node, which can be realized by an entity device, such as a server device, or by a virtual computing unit created in the entity device, such as an instance, a container, and so on. As shown in FIG. 1, in the distributed storage system, data is stored in a distributed file system. On the one hand, a plurality of distributed cache nodes communicate with the distributed file system to cache original data in a data storage unit inside the cache node. On the other hand, the cache nodes receive a data read request transmitted by the client and transmit the cached data to the client, thus reducing the direct access of a large number of clients to the distributed storage system, reducing the network load and improving the overall performance of a distributed database.

In the application scenario of data caching for the distributed storage system, in the prior art, through remote direct data read instruction (an instruction used to read data in remote direct data access technology), it can effectively reduce the use of memory access for a computing node CPU, better use a read-write bandwidth of distributed memory, thereby reducing a data read-write latency and improving performance of the database. However, due to the use of remote direct data read instruction, there is a characteristic where unilateral read operations are not visible on a server side. That is, the server (such as the cache node) cannot get the specific data content requested by the client. Therefore, it is not possible to manage cold and hot data based on a frequency of the specific data requested by the client. That is, it is not possible to store the hot data in an appropriate location in the data storage unit in the cache node to achieve load balancing, access medium read-write performance matching and other goals, which leads to cache hotspot problems and affects the access efficiency and performance of the database. The embodiments of the present disclosure provide a method of data processing to solve the above problems.

Figure 2:
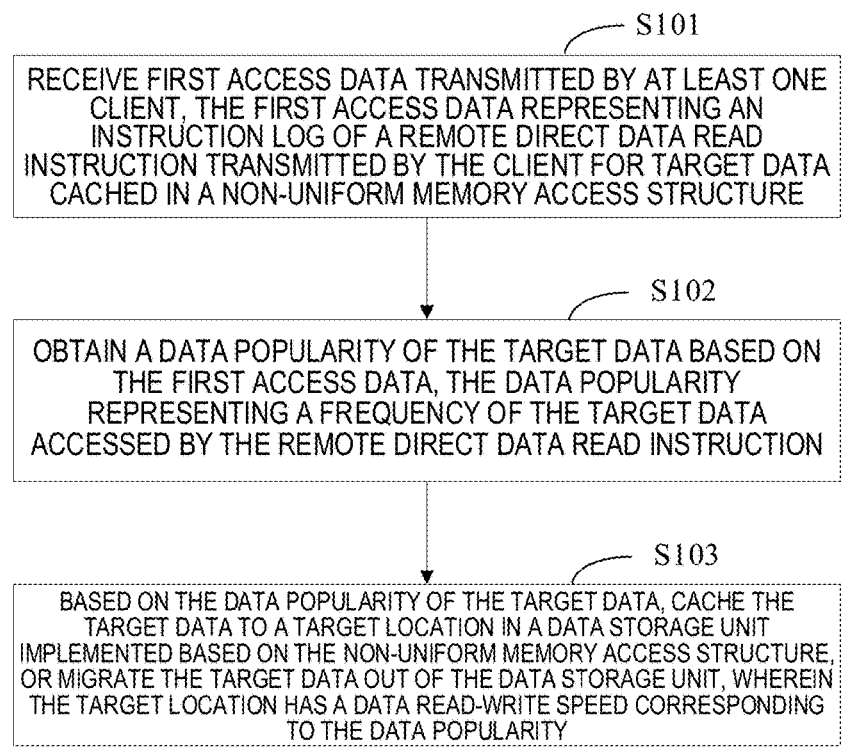
FIG. 2 is first schematic flow diagram of the method of data processing provided by an embodiment of the present disclosure.

Referring to FIG. 2, which is a first schematic flow diagram of the method of data processing provided by an embodiment of the present disclosure. The method of this embodiment can be applied in the cache node, such as the server or the instance running in the server. The method of data processing includes:

Step S101: receiving first access data transmitted by at least one client, the first access data representing an instruction log of a remote direct data read instruction transmitted by the client for target data cached in a non-uniform memory access structure.

For example, referring to the schematic diagram of the application scenario shown in FIG. 1, when the client needs to access data, it will transmit a data read request to the cache node. The cache node includes a data storage unit. The data storage unit in the cache node is implemented based on non-uniform memory access structure (NUMA). In this embodiment, the cache node contains a plurality of non-uniform memory access structures that are connected to each other to achieve access to memory data. The specific implementation principle of the non-uniform memory access structure is the prior art, which will not be repeated here. More specifically, the client transmits a unilateral read request based on a remote direct data access (RDMA) protocol to the cache node, that is, a remote direct data read instruction, or the client transmits read request based on a remote procedure call (RPC) to the cache node to quickly obtain the corresponding target data from the cache node. Of course, it can be understood that the situation where the client transmits a data write request to the cache node is similar to the situation where the data read request is transmitted, and will not be repeated here. In this process, the client will generate the corresponding first access data based on the content contained in the transmitted data read request, that is, an instruction log for target data, that is, an access log. The instruction log for the target data includes, for example, a name, access time, access number, access frequency and other information of the target data. On this basis, as an example, the first access data can also include information such as the cache node where the target data is located, and the specific data storage unit in the cache node that stores the target data. After that, the client transmits the first access data to the cache node. After the cache node receives the first access data, it processes it and executes subsequent steps. Optionally, the client transmits the first access data asynchronously to the cache node, and the cache node can obtain the first access data asynchronously through a queue. A specific implementation can be set as needed, and will not be repeated here.

Step S102: obtaining a data popularity of the target data based on the first access data, the data popularity representing a frequency of the target data accessed by the remote direct data read instruction.

As an example, after receiving the first access data, the cache node parses the first access data based on a corresponding protocol, determines the data popularity that represents the frequency of the target data being accessed by the remote direct data read instruction based on the content of the first access data, such as one or more information of the name, access time, access number, access frequency, etc. of the target data as the example in the previous step. Specifically, for example, the cache node determines a time interval based on a plurality of assess time of the target data, and then counts the sum of the number of all access requests for the target data within the time interval, to obtain the data popularity. The greater the data popularity of the target data, it represents that the more frequently the target data is accessed. On the contrary, the smaller the data popularity of the target data, it represents that the less frequently the target data is accessed. Based on the data popularity and preset popularity threshold, the data can be divided into "hot data" and "cold data". There are many ways to realize the data popularity, for example, based on the access number of data within a preset time duration; for example, the frequency of data being periodically accessed. The number corresponding to data popularity can be an actual number, such as the access number, or a normalized value representing the frequency, which is not limited herein.

Figure 3:
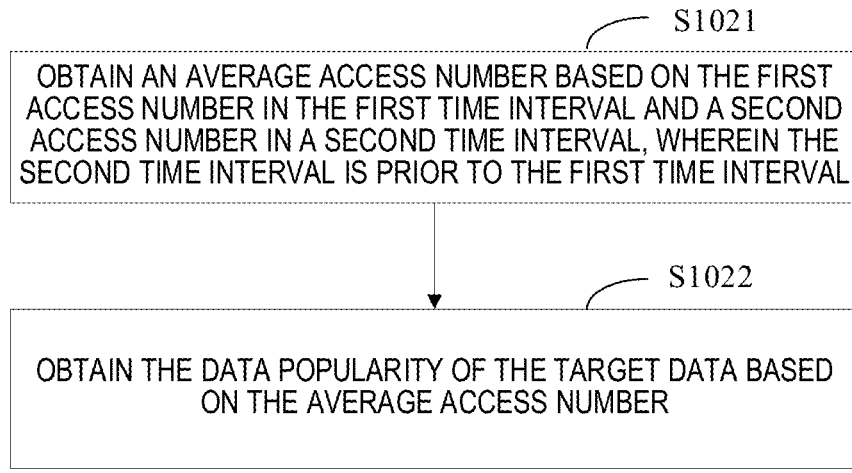
FIG. 3 is a flowchart of a specific implementation of step S102 in the embodiment shown in FIG. 2.

In a possible implementation, the first access data includes a first access number of the target data in the first time interval, as shown in FIG. 3. A specific implementation of step S102 includes:

Step S1021: obtaining an average access number based on the first access number in the first time interval and a second access number in a second time interval, wherein the second time interval is prior to the first time interval.

Step S1022: obtaining the data popularity of the target data based on the average access number.

As an example, the first time interval is a real-time statistical interval for the first access number. In a possible implementation, the first time interval is a time interval formed by a first moment when the client generates the first access data and a preset time duration before the first moment. Therefore, the first access number in the first time interval can be understood as the instruction log generated by the client for the target data in the current period. The second time interval is the time interval before the first time interval, that is, a historical time interval. Therefore, the second access number in the second time interval can be understood as a historical instruction log of the target data. After the cache node obtains the first access number in the first time interval through the first access data, it combines the second access number in the second time interval, that is, the historical instruction log of the target data, and conducts weighted calculation to obtain a data that can average the access number of the target data in the current period and the historical period, that is, the average access number. Then, based on the average access number, it is mapped to the corresponding data popularity. The more the average access number, the greater the data popularity. On the contrary, the smaller the average access number, the smaller the data popularity.

The second time interval and the second access number corresponding to the second time interval can be preset in the cache node or in an external access medium communicated with the cache node. The cache node can directly read the second access number corresponding to the second time interval, and maintain and update it. A specific implementation is not limited here.

In the step of this embodiment, the first access number in the first time interval are modified by combining the historical instruction log to obtain the average access number, and then the data popularity is obtained based on the average access number to reduce the data popularity fluctuation. Since the target data needs to be migrated based on the data popularity in the subsequent example steps, the frequency of the migration of the target data can be reduced by reducing fluctuation of the data popularity, reducing the system computing resource and bandwidth consumption, and improving the system stability.

Figure 4:
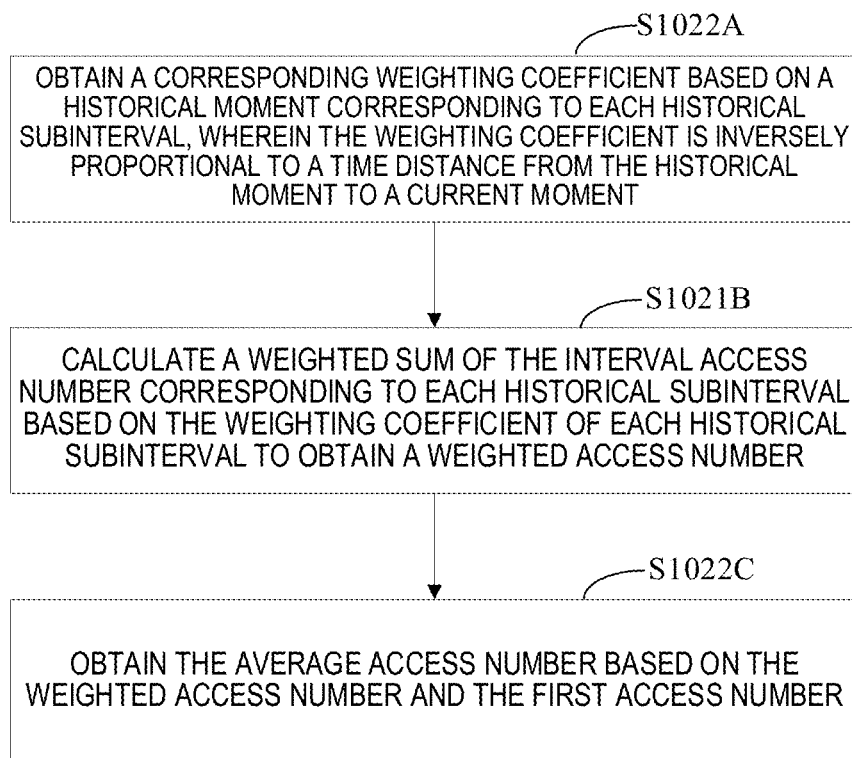
FIG. 4 is a flowchart of a specific implementation of step S1021 in the embodiment shown in FIG. 3.

Further, as an example, the second time interval includes at least one historical subinterval, and the second access number includes an interval access number corresponding to each historical subinterval, as shown in FIG. 4. The specific implementation of step S1021 includes:

Step S1021A: obtaining a corresponding weighting coefficient based on a historical moment corresponding to each historical subinterval, wherein the weighting coefficient is inversely proportional to a time distance from the historical moment to a current moment.

Step S1021B: calculating a weighted sum of the interval access number corresponding to each historical subinterval based on the weighting coefficient of each historical subinterval to obtain a weighted access number.

Step S1021C: obtaining the average access number based on the weighted access number and the first access number.

As an example, the second time interval as the historical time interval is composed of a plurality of historical subintervals, each historical subinterval corresponds to an interval access number, and the historical subinterval corresponding to the second time interval can be counted and obtained by the cache node based on the first access data transmitted by one or more client in the previous historical period. In the process of calculating the average access number, the corresponding weighting coefficient is determined based on a time distance between the historical moment and the current moment corresponding to each historical subinterval. The longer the time distance is, the smaller the weighting coefficient of the corresponding interval access number is, and the smaller the proportion in the generated average access number is. In short, the longer the access data is, the less important it is. Then, based on the weighting coefficient of each historical subinterval, the interval access number of the corresponding historical subinterval are weighted and summed to obtain the weighted access number of the second time interval. Then, the weighted access number and the first access number are weighted and summed to get the average access number after weighted correction based on historical time.

Figure 5:
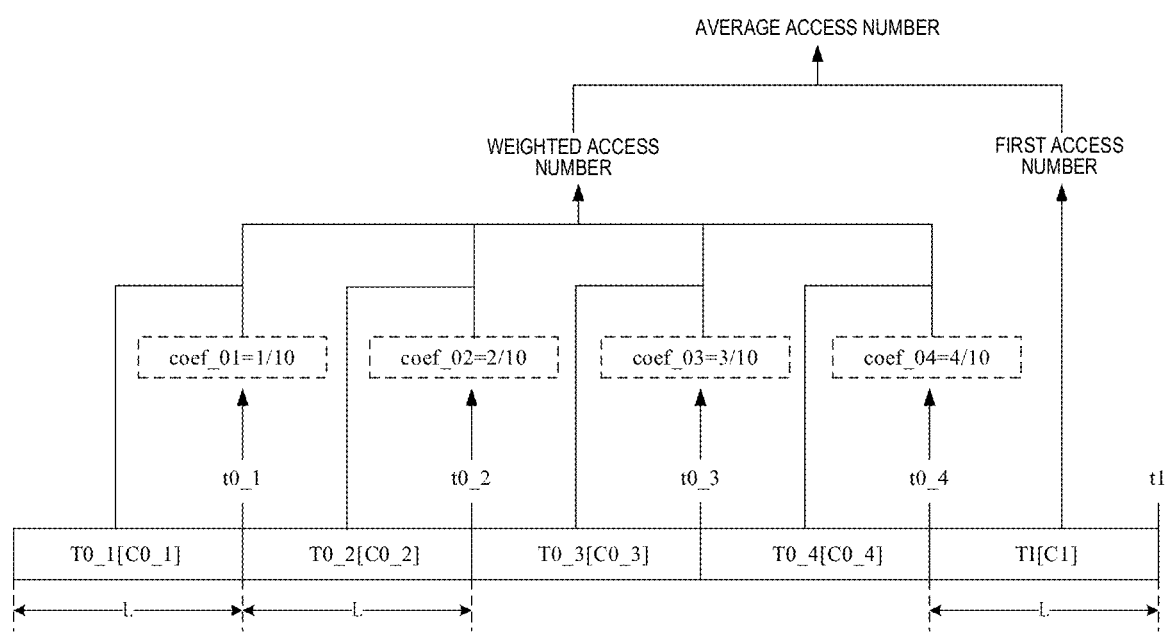
FIG. 5 is a schematic diagram of a process of obtaining an average access number provided by an embodiment of the present disclosure.

FIG. 5 is a schematic diagram of the process of obtaining the average access number provided by an embodiment of the disclosure. As shown in FIG. 5, after the cache node obtains the first time interval T1 and the corresponding first access number C1 (TI [C1] shown in the figure), it obtains a plurality of historical subintervals (i.e. the second time interval) before the first time interval T1 and the corresponding interval access number of each historical subinterval. As shown in the figure, the historical subinterval T0_1 and the corresponding interval access number C0_1 (T0_1 [C0_1] shown in the figure), the historical subinterval T0_2 and the corresponding interval access number C0_2 (T0_2 [C0_2] shown in the figure), the historical subinterval T0_3 and the corresponding interval access number C0_3 (T0_3 [C0_3] shown in the figure), the historical subinterval T0_4 and the corresponding interval access number C0_4 (T0_4 [C0_4] shown in the figure) are included. The interval lengths of the first time interval T1, and the historical subinterval T0_1, the historical subinterval T0_2, the historical subinterval T0_3, and the historical subinterval T0_4 are the same, all of which are L. The historical moment corresponding to the historical subinterval T0_1, historical subinterval T0_2, historical subinterval T0_3, and historical subinterval T0_4 is an end time of the respective historical subinterval: t0_1, t0_2, t0_3, t0_4. The current moment is the end time t1 of the first time interval T1. Based on the visual distance between the end moment of each historical subinterval and the current moment, the normalized weighting coefficient of each historical subinterval is coef_01=1/10, coef_02=2/10, coef_03=3/10, coef_04=4/10 (the corresponding relationship is shown in the figure), respectively. Then, based on the interval access number corresponding to each historical subinterval, the weighted sum is performed to obtain the corresponding weighted access number. Then, the sum of the weighted access number and the first access number (that is, the weighted access number has the same weight as the first access number) is calculated to get the average access number.

Of course, it can be understood that the above weighting way is only one of many possible ways to calculate the average access number. The average access number can also be obtained by other weighting ways as needed. For example, set the corresponding weighting coefficient for the first time interval T1, normalize the above historical subinterval T0_1, historical subinterval T0_2, historical subinterval T0_3, historical subinterval T0_4 and the first time interval T1 to obtain the historical subinterval T0_1, historical subinterval T0_ 2, historical subinterval T0_3, historical subinterval T0_4 and the first time interval T1 as: coef_01=1/15, coef_02=2/15, coef_03=3/15, coef_04=4/15, coef_1=4/15 respectively; Then the first access number is weighted based on coef_1 and then summed with the weighted access number (that is, the weighted access number is different from the weight of the first access number) to get the average access number.

In this embodiment, based on the time distance between the historical moment corresponding to the historical subinterval and the current moment, multi-level weighting is performed to smooth the instruction log generated at different historical moment, reduce the jump of the average access number, and thus make the calculation of the data popularity of the target data more stable and accurate.

Step S103: based on the data popularity of the target data, caching the target data to a target location in a data storage unit implemented based on the non-uniform memory access structure, or migrating the target data out of the data storage unit, wherein the target location has a data read-write speed corresponding to the data popularity.

As an example, after obtaining the data popularity of the target data, the target data is processed accordingly based on the data popularity of the target data, including, specifically, replacement and migration of the target data. As an example, the replacement refers to caching target data to the data storage unit, and/or migrating the target data out of the data storage unit. In a possible implementation, when the data popularity of the target data is greater than a first preset value, the target data is determined as hot data. At this time, if the target data is not cached in the data storage unit in the cache node, the target data is cached from the database to the data storage unit in the cache node. When the data popularity of the target data is less than the first preset value, the target data is determined as cold data. At this time, if the target data has been cached in the data storage unit in the cache node, the target data is migrated out of the data storage unit. Further, when an available space of the data storage unit is greater than a space threshold, the above steps of caching the target data to the data storage unit and migrating the target data out of the data storage unit can be executed independently. When the available space of the data storage unit is less than the space threshold, the above steps of moving the target data out of the data storage unit and caching the target data to the data storage unit need to be executed successively.

As an example, the migration refers to the migration of the target data from a non-target location in the data storage unit to a target location. In a possible implementation, when the data popularity of the target data is greater than the first preset value, the target data is determined as hot data. At this time, the target data is migrated from a first storage location of the data storage unit to a second storage location (target location), so that the target data has better access efficiency. When the data popularity of the target data is less than a second preset value, the target data is determined as cold data. At this time, the target data is migrated from the second storage location (target location) of the data storage unit to the first storage location, so as to realize the release of the storage resource and improve the overall access efficiency of the data storage unit.

Optionally, when the target data is not cached in the data storage unit, before step S103, it also includes:

Step S104: obtaining a migrating-out time duration of the target data, the migrating-out time duration representing a lasting time of the target data being migrated out of the data storage unit.

Accordingly, a specific implementation of step S103 is to cache the target data to the target location of the data storage unit when the migrating-out time duration is greater than the second duration.

As an example, when the data storage unit performs the migrating-out operation on the target data, because the data migrating-out is more time-consuming and more costly, in order to avoid repeated migrating-in and migrating-out, in the steps of this embodiment, after the target data is migrated out, a second judgment is made based on the migrating-out time duration of the target data. If the migrating-out time duration is greater than the second time duration, that is, the target data is not migrated out for a short time, then the step of caching the target data to the target location of the data storage unit is executed. If the migrating-out time duration is less than the second time duration, that is, representing that the target data has just migrated out of the data storage unit, in this case, the step of caching the target data to the target location of the data storage unit is not executed, so as to avoid the repeated migration of the target data into and out of the data storage unit, reduce the consumption of invalid resources, and improve the storage efficiency of the data storage unit.

In this embodiment, by receiving the first access data transmitted by the at least one client, the first access data representing the instruction log of the client for the target data; based on the first access data, obtaining the data popularity of the target data, the data popularity representing the frequency of the target data being accessed; based on the data popularity of the target data, caching the target data to the target location of the data storage unit, or migrating the target data out of the data storage unit. The data popularity of the target data is determined by receiving the first access data transmitted by the client, and then targeted processing is carried out on the data popularity to cache it to the target location of the data storage unit whose read-write speed matches or migrate it out of the data storage unit, thereby improving the cache efficiency of the cache node for the target data, avoiding the formation of the cache hotspot, and thus improving the overall performance of the database.

Figure 6:
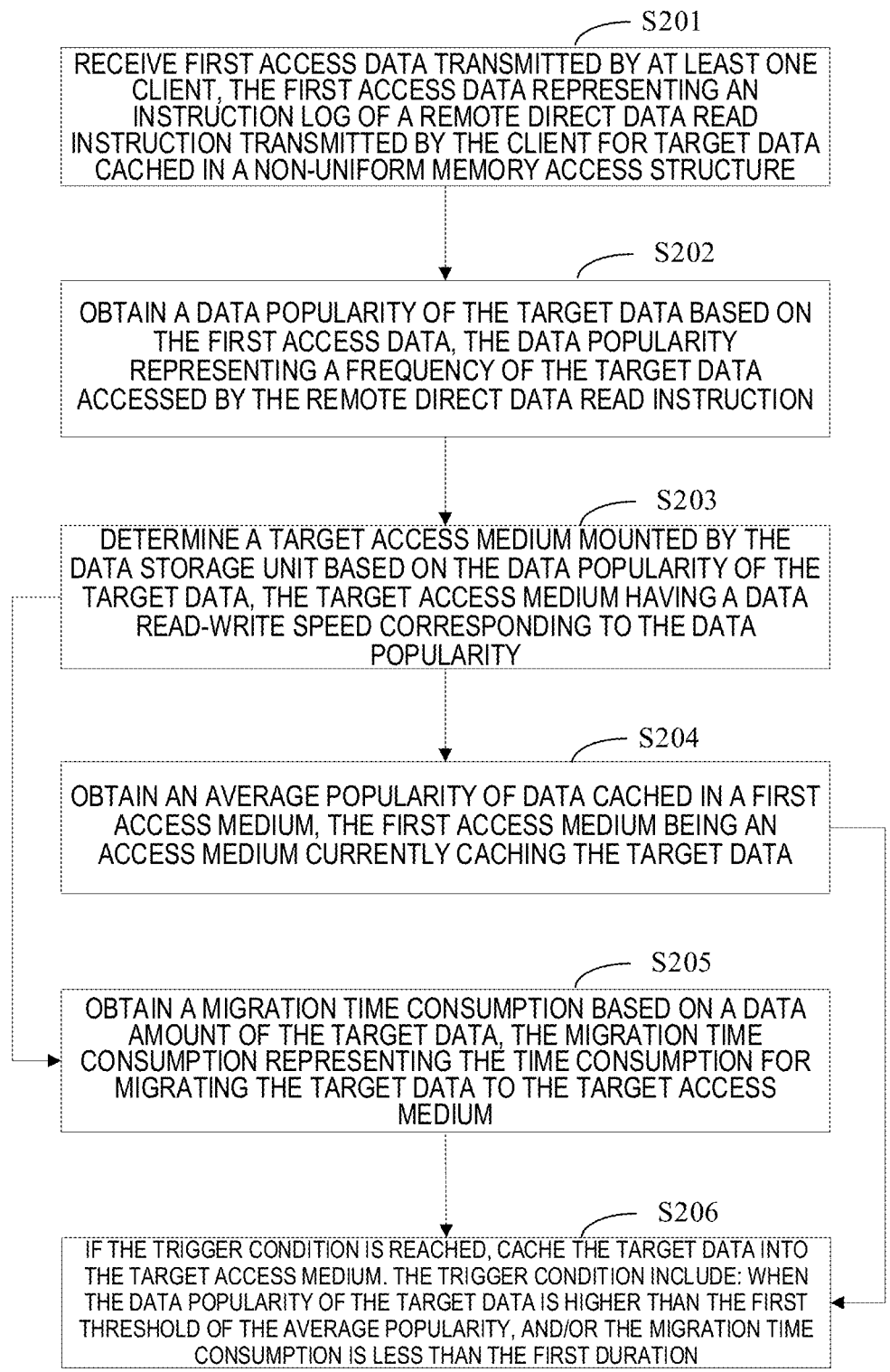
FIG. 6 is a second schematic flow diagram of the method of data processing provided by an embodiment of the present disclosure.

Referring to FIG. 6, which is a second schematic flow diagram of the method of data processing provided by an embodiment of the present disclosure. On the basis of the embodiment shown in FIG. 2, this embodiment further refines the migration of the target data in the data storage unit. In this embodiment, the method of data processing includes:

Step S201: receiving first access data transmitted by at least one client, the first access data representing an instruction log of a remote direct data read instruction transmitted by the client for target data cached in a non-uniform memory access structure.

Step S202: obtaining a data popularity of the target data based on the first access data, the data popularity representing a frequency of the target data accessed by the remote direct data read instruction.

Step S203: determining a target access medium mounted by the data storage unit based on the data popularity of the target data, the target access medium having a data read-write speed corresponding to the data popularity.

As an example, in this embodiment, the data storage unit in the cache node is a non-uniform memory access structure (Non Uniform Memory Access, NUMA) structure. In this embodiment, the cache node contains a plurality of interconnected non-uniform memory access structure for accessing the memory data. Further, the non-uniform memory access structure implements the data caching by mounting access medium. The non-uniform memory access structure mounts different types of access medium at different locations (local or remote), and access medium of different types and at different locations have different data read-write speed. For example, the access medium mounted by the non-uniform memory access structure include: a dynamic random access memory (Dynamic Random Access Memory, DRAM); a persistent memory (PMEM) located locally to the non-uniform memory access structure; a persistent memory located remotely from the non-uniform memory access structure; a solid state drive (SSD) located locally to the non-uniform memory access structure; a solid state drive located remotely from the non-uniform memory access structure. The data read-write speed of the above access medium decreases in turn. When the space of the access medium is limited, the access medium with high data read-write speed is allocated to store the data of high popularity, while the access medium with low data read-write speed is allocated to store the data of low popularity, which can improve the overall data cache efficiency of the non-uniform memory access structure.

Figure 7:
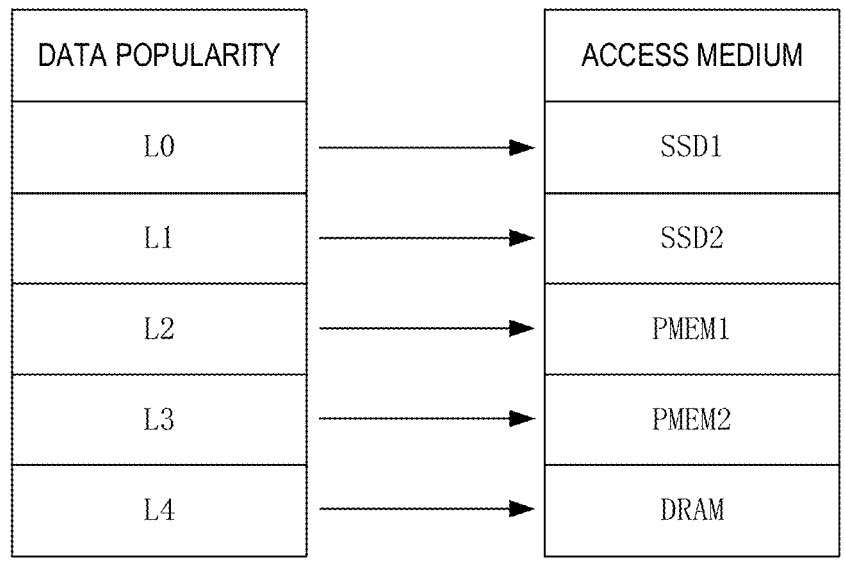
FIG. 7 is a schematic diagram of a mapping relationship between a first data popularity and an access medium provided by an embodiment of the present disclosure.

In a possible implementation, the data popularity is a level identifier that represents the popularity level. FIG. 7 is a schematic diagram of the mapping relationship between the first data popularity and the access medium provided by an embodiment of the present disclosure. As shown in FIG. 7, when the data popularity is divided into L1 to L5, more specifically, for example, when the average access number of the target data in the third time duration is $1<=N<100$, the cache node generates a corresponding data popularity L0 based on the first access data, and the access medium corresponding to the level identifier L0 is a solid state drive located remotely from the non-uniform memory access structure (SSD1 shown in the figure). Similarly, when the average access number of the target data in the third time duration is $100<=N<1000$, the generated corresponding data popularity is L1, and the access medium corresponding to the level identification L1 is a solid state drive (SSD2 shown in the figure) located locally to the non-uniform memory access structure. When the average access number of the target data in the third time duration is $1000<=N<10000$, the generated corresponding data popularity is L2, and the access medium corresponding to the level identification L2 is persistent memory (PEME1 shown in the figure) located remotely from the non-uniform memory access structure. When the average access number of the target data in the third time duration is $10000<=N<100000$, the generated corresponding data popularity is L3, and the access medium corresponding to the level identification L3 is persistent memory (PEME2 is shown in the figure) located locally in the non-uniform memory access structure. When the average access number of the target data in the third time duration is $N>=100000$, the generated corresponding data popularity is L4, and the access medium corresponding to the level identification L4 is a dynamic random access memory (DRAM shown in the figure). Based on the mapping relationship shown in FIG. 7, after the data popularity of the target data is obtained, it can be mapped to the corresponding target access medium.

In a possible implementation, the first access data includes granularity information representing a classification granularity of the target data. The larger the classification granularity is, the larger the volume of the cached target data is. On the contrary, the smaller the classification granularity is, the smaller the volume of the cached target data is. When the classification granularity is large, the large volume of the target data is cached, which can increase the cache hit rate in the subsequent client access process. As a corresponding cost, it will cause a large space occupation for the access medium. In a possible implementation, granularity information can be represented by a data identifier of the target data, for example, the classification granularity of the target data can be represented by the data name of the target data.

In this embodiment, before determining the target access medium mounted by the data storage unit based on the data popularity of the target data, the method also includes: obtaining the data storage unit for caching the target data based on the granularity information.

As an example, based on the granularity information contained in the first access data, the cache node can determine a data storage unit that matches the performance and remaining space dimensions to store the target data, thereby improving the data cache efficiency, balancing the load among the data storage units, and thus improving the overall performance of the database.

Optionally, after step S203, it also includes:

Step S204: obtaining an average popularity of data cached in a first access medium, the first access medium being an access medium currently caching the target data.

As an example, when the target data has been cached to the data storage unit, the data popularity of other data stored in the first access medium where the target data is located is first obtained, thus obtaining the average popularity of the data cached in the first access medium. The data popularity of other data may be information generated in advance and maintained in the cache node whose generation way is the same as the data popularity of the target data obtained in the above steps, which will not be repeated. Further, the average popularity may be the information that the cache node completes the calculation in advance and stores locally in the cache node, or the information that the cache node calculates in real time after receiving the first access data, which will not be limited here. Subsequently, based on the average popularity, it is used as a judgment condition to determine whether to trigger data migration between access medium for the target data.

Step S205: obtaining a migration time consumption based on a data amount of the target data, the migration time consumption representing the time consumption for migrating the target data to the target access medium.

As an example, further, the first access data can contain the data amount of the target data, or the cache node can query the data amount of the target data in the local or distributed storage system of the cache node through the data identification of the target data to obtain the data amount of the target data. Then, the cache node determines the migration time consumption based on the data amount of the target data, the data read-write speed (read speed) of the first access medium where the target data is currently located, and the data read-write speed (write speed) of the target access medium. A specific implementation can be calculated based on the lower value of the data read-write speed of the first access medium and the data read-write speed of the target access medium. The specific process will not be repeated.

Step S206: If the trigger condition is reached, caching the target data into the target access medium. The trigger condition includes: when the data popularity of the target data is higher than the first threshold of the average popularity, and/or the migration time consumption is less than the first duration.

As an example, when one or all of the above steps S204 and S205 are executed, it is judged according to the corresponding execution results. If the trigger condition is reached, that is, if the data popularity of the target data is higher than the first threshold of the average popularity, and/or the migration time consumption is less than the first time, the target data will be migrated from the current first access medium to the target access medium, so that the access medium where the target data is located will be more data popularity.

Specifically, when the data popularity of the target data is higher than the first threshold of average popularity, it represents that the data popularity of the target data has been significantly higher than the average popularity of the first access medium where it is currently located. In this case, the migration of the target data is triggered. On the one hand, by limiting of the preset first threshold, it can avoid the problem of the data popularity of the target data only occurring slight fluctuations, that is, triggering the migration of the target data, and avoiding the waste of computing resources and network resources caused by frequent and inefficient data migration. On the other hand, due to the change of free/busy time of access volume of the client, it will lead to the tide phenomenon of the access volume. The scheme to determine the trigger time of data migration by comparing the real-time data popularity of the target data with the fixed popularity threshold will be affected by the tide phenomenon and trigger the data migration by mistake, so that the data will gather to the high-speed access medium, thus affecting the data cache effect. In this embodiment, the scheme of determining the trigger time of data migration through the average popularity of the first access medium where the target data is located can avoid the impact of the above tidal phenomenon, that is, when the overall access volume of client is high (busy hours), the data popularity of the target data will increase, and at the same time, the data popularity of other data in the first access medium will also increase, so the corresponding average popularity of the first access medium will increase synchronously. Taking the average popularity as the judgment standard for data migration of the target data can avoid the false trigger of data migration and improve the data cache effect.

On the other hand, by comparing the migration time consumption and the first time duration, it can be judged whether the migration process of the target data in the data storage unit can be completed within the first time duration, so as to avoid the problem that the migration time consumption is too long and cannot be completed within a detection cycle, resulting in the loss of data popularity effectiveness, and improve the effectiveness of caching target data based on data popularity and the access hit rate of cached target data.

Figure 8:
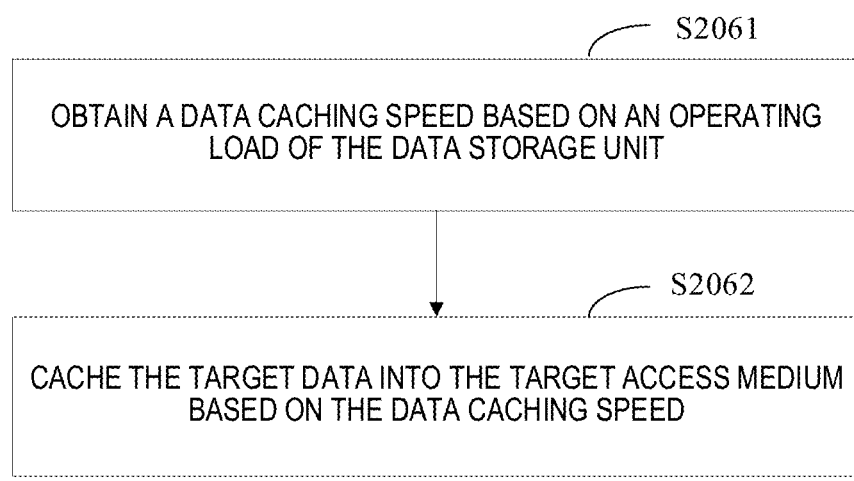
FIG. 8 is a flowchart of a specific implementation of step S206 in the embodiment shown in FIG. 6.

Optionally, as shown in FIG. 8, the specific implementation of step S206 includes:

Step S2061: obtaining a data caching speed based on an operating load of the data storage unit.

Step S2062: caching the target data into the target access medium based on the data caching speed.

For example, during the migration of the target data, the cache node can further adjust the speed of data migration (that is, data cache speed) through the operating load of the data storage unit where the target data is located, so as to avoid the problem of bandwidth resource and computing resource exhaustion and affect the stability of data access. Specifically, the operating load can be determined by the current available thread resources, CPU utilization, available bandwidth resources, etc. of the data storage unit, and then mapped to the corresponding data cache speed according to the operating load. In a possible implementation, the operating load can be a normalized value or percentage value. During the migration of the target data, the cache node detects the operating load in real time. When the operating load exceeds the load threshold, the current data cache speed will be reduced to avoid the problem of running resource exhaustion.

Figure 9:
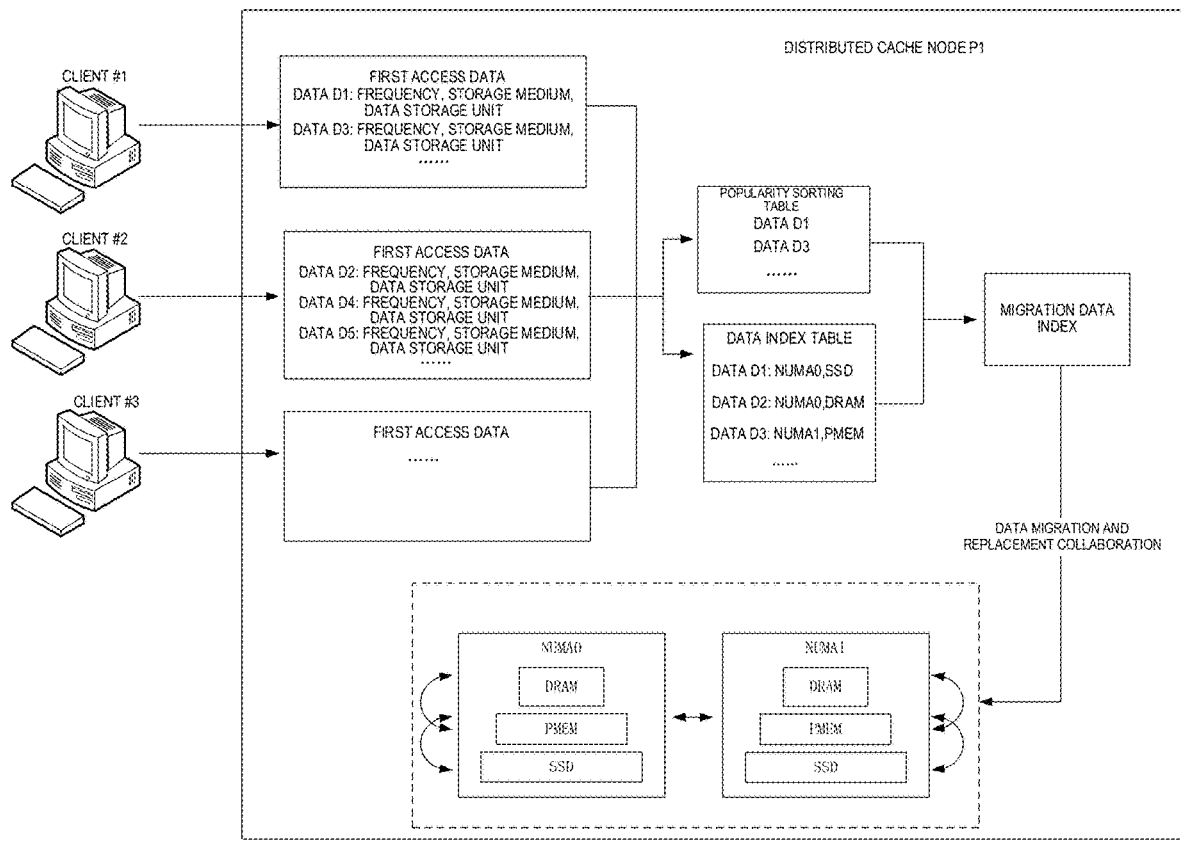
FIG. 9 is a schematic diagram of data processing for data in a non-uniform memory access structure in a cache node provided by an embodiment of the present disclosure.

FIG. 9 is a schematic diagram of data processing for data in the non-uniform memory access structure in the cache node provided by an embodiment of the present disclosure. As shown in FIG. 9. by way of example, a plurality of clients (such as client #1, client #2, and client #3) transmit corresponding first access data to the distributed cache node P1, and the first access data includes data identifiers of different target data (such as data D1 to data D5), as well as corresponding frequency, storage medium, and data storage unit. Then, based on the first access data transmitted by each client, the data popularity is sorted, and the data popularity sorting table represented by the data ID and the corresponding data index table are obtained. The data index table includes the identification of the data storage unit corresponding to each target data (NUMA_0 and NUMA_1 are included in the figure) and the corresponding storage medium (SSD, DRAM and PMEM are included in the figure). Then, according to the data popularity sorting table and the corresponding data index table, the migration data index is obtained. The migration data index is used to represent the data identification of the target data to be migrated, as well as the target location of the migration. Then, data migration and replacement collaboration between data storage unit and within data storage unit is implemented based on the migration data index.

In this embodiment, a specific implementations of steps S201 and S202 are consistent with the implementations of steps S101 and S102 in the embodiment shown in FIG. 2 above. Please refer to the relevant introduction in the embodiment shown in FIG. 2 for detailed discussion, which will not be repeated here.

Figure 10:
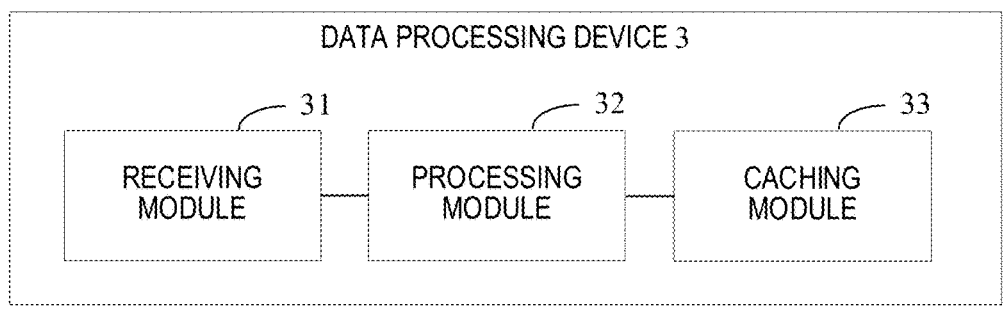
FIG. 10 is a structural diagram of the data processing device provided by an embodiment of the present disclosure.

Corresponding to the method of data processing of the above embodiment, FIG. 10 is a structural block diagram of the data processing device provided by an embodiment of the present disclosure. For the sake of illustration, only the parts related to the embodiments of the present disclosure are shown. Referring to FIG. 10, the data processing device 3 is applied to the cache node, and the cache node includes at least one data storage unit, including:

a receiving module 31 configured to receive first access data transmitted by at least one client, the first access data representing an instruction log of a remote direct data read instruction transmitted by the client for target data cached in a non-uniform memory access structure;

a processing module 32 configured to obtain a data popularity of the target data based on the first access data, the data popularity representing a frequency of the target data accessed by the remote direct data read instruction;

a caching module 33 configured to, based on the data popularity of the target data, cache the target data to a target location in a data storage unit implemented based on the non-uniform memory access structure, or migrating the target data out of the data storage unit, wherein the target location has a data read-write speed corresponding to the data popularity.

In an embodiment of the present disclosure, the first access data includes a first access number of the target data in a first time interval, the processing module 32 is specifically configured to: obtain an average access number based on the first access number in the first time interval and a second access number in a second time interval, wherein the second time interval is prior to the first time interval; and obtain the data popularity of the target data based on the average access number.

In one embodiment of the present disclosure, the second time interval includes at least one historical subinterval, and the second access number includes an interval access number corresponding to each historical subinterval; when obtaining an average access number based on the first access number in the first time interval and a second access number in a second time interval includes, the processing module 32 is specifically configured to: obtain a corresponding weighting coefficient based on a historical moment corresponding to each historical subinterval, wherein the weighting coefficient is inversely proportional to a time distance from the historical moment to a current moment; calculate a weighted sum of the interval access number corresponding to each historical subinterval based on the weighting coefficient of each historical subinterval to obtain a weighted access number; and obtain the average access number based on the weighted access number and the first access number.

In one embodiment of the present disclosure, the caching module 33 is specifically configured to: determine a target access medium mounted by the data storage unit based on the data popularity of the target data, the target access medium having a data read-write speed corresponding to the data popularity; and cache the target data into the target access medium.

In an embodiment of the present disclosure, the target access medium mounted by the data storage unit includes at least one of: a dynamic random access memory; a persistent memory located locally to the non-uniform memory access structure; a persistent memory located remotely from the non-uniform memory access structure; a solid state drive located locally to the non-uniform memory access structure; a solid state drive located remotely from the non-uniform memory access structure.

In an embodiment of the present disclosure, in response to the target data being cached in the data storage unit, the caching module 33 is further configured to: obtain an average popularity of data cached in a first access medium, the first access medium being an access medium currently caching the target data; when caching the target data into the target access medium, the caching module 33 is specifically configured to: in response to the data popularity of the target data being higher than the average popularity by a first threshold value, migrate the target data to the target access medium, wherein the first threshold value is determined based on at least a data amount of the target data.

In an embodiment of the present disclosure, prior to caching the target data into the target access medium, the caching module 33 is further configured to: obtaining a migration time consumption based on a data amount of the target data, the migration time consumption representing the time consumption for migrating the target data to the target access medium; when caching the target data into the target access medium, the caching module 33 is specifically configured to: if the migration time consumption is less than a first time duration, cache the target data into the target access medium.

In an embodiment of the present disclosure, the caching module 33 is specifically configured to: obtain a data caching speed based on an operating load of the data storage unit; and cache the target data into the target access medium based on the data caching speed.

In an embodiment of the present disclosure, in response to the target data being not cached in the data storage unit, the caching module 33 is further configured to: obtain a migrating-out time duration of the target data, the migrating-out time duration representing a lasting time of the target data being migrated out of the data storage unit; the caching module 33 is specifically configured to: in response to the migrating-out time duration being greater than a second time duration, cache the target data to the target location of the data storage unit.

In one embodiment of the present disclosure, the first access data includes granularity information representing a classification granularity of the target data; and the processing module 32 is further configured to: obtain the data storage unit for caching the target data based on the granularity information.

In an embodiment of the present disclosure, the apparatus further includes at least one of: the first access data is generated based on a remote direct data access request or a remote procedure call request transmitted by the client to a cache node; the first access data includes at least one of: an identification of the cache node, an identification of the data storage unit, or an identification of an access medium mounted by the data storage unit.

The receiving module 31, the processing module 32 and the caching module 33 are connected in turn. The data processing device 3 provided in this embodiment can execute the technical solution of the above method embodiment, and its implementation principle and technical effect are similar. Embodiments of the present disclosure will not be repeated here.

Figure 11:
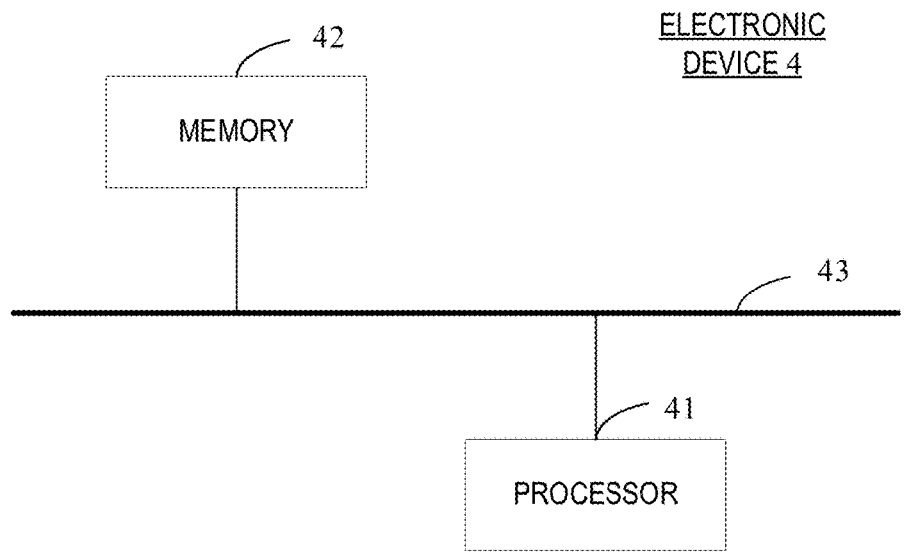
FIG. 11 is a schematic diagram of the structure of an electronic device provided by an embodiment of the present disclosure.

FIG. 11 is a schematic diagram of the structure of an electronic device provided by an embodiment of the present disclosure. As shown in FIG. 11, the electronic device 4 includes:

a processor 41, and a memory 42 communicatively coupled to the processor 41;

wherein the memory 42 stores computer-executable instructions; and the processor 41 executes the computer-executable instructions stored by the memory 42 to carry out the method of data processing in the embodiments shown in FIGS. 2 to 9.

Optionally, the processor 41 and the memory 42 are connected via bus 43.

The relevant explanations can be understood by referring to the relevant descriptions and effects corresponding to the steps in the embodiments shown in FIGS. 2-9, and will not be described in detail here.

The embodiments of the present disclosure provide a computer-readable storage medium, in which computer-executable instructions are stored, and when the computer-executable instructions are executed by the processor, they are used to realize the method of data processing provided by any of the embodiments corresponding to FIGS. 2 to 9 of the present disclosure.

The embodiments of the present disclosure provide a computer program product, which includes a computer program. When the computer program is executed by a processor, the method of data processing in the embodiment shown in FIGS. 2 to 9 is implemented.

Figure 12:
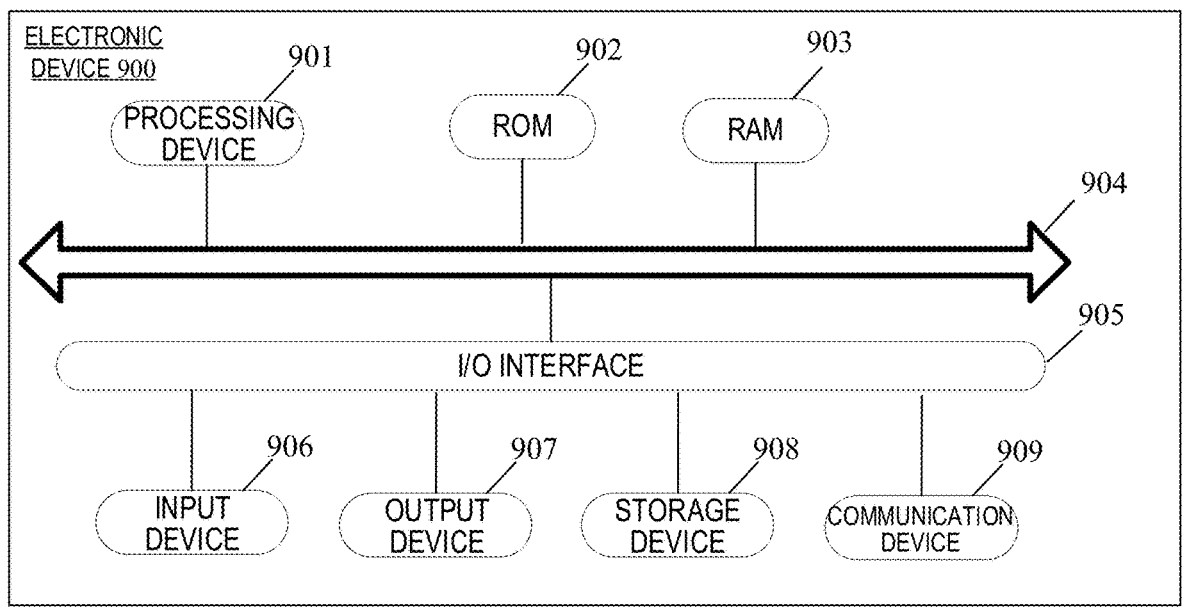
FIG. 12 is a schematic diagram of a hardware structure of an electronic device provided by an embodiment of the present disclosure.

Referring to FIG. 12, which shows a schematic diagram of the structure of an electronic device 900 suitable for implementing the embodiments of the present disclosure. The electronic device 900 can be a terminal device or a server. The terminal device may include but are not limited to mobile terminals such as mobile phones, laptops, digital broadcast receivers, Personal Digital Assistant (PDA), Portable Android Device (PAD), Portable Medium Player (PMP), in car terminals (such as in car navigation terminals), as well as fixed terminals such as digital TVs, desktop computers, etc. The electronic device shown in FIG. 12 is only an example and should not impose any limitations on the functionality and scope of use of the embodiments of the present disclosure.

As shown in FIG. 12, the electronic device 900 may include a processing device (such as a central processing unit, graphics processor, etc.) 901, which may perform various appropriate actions and processes based on programs stored in Read Only Memory (ROM) 902 or programs loaded from storage device 908 into Random Access Memory (RAM) 903. In RAM 903, various programs and data required for the operation of the electronic device 900 are also stored. The processing device 901, ROM 902, and RAM 903 are connected to each other through bus 904. The input/output (I/O) interface 905 is also connected to bus 904.

Typically, the following devices can be connected to I/O interface 905: an input device 906 including, for example, a touch screen, a touchpad, a keyboard, a mouse, a camera, a microphone, an accelerometer, a gyroscope, etc.; an output device 907 including, for example, a Liquid Crystal Display (LCD), a speaker, a vibrator, etc.; a storage device 908 including, for example, a magnetic tape, a hard drive, etc.; and a communication device 909. The communication device 909 can allow the electronic device 900 to communicate wirelessly or through wire with other devices to exchange data. Although FIG. 12 illustrates the electronic device 900 with various devices, it should be understood that it is not required to implement or have all the shown devices. It can be implemented or equipped with more or fewer devices as an alternative.

Specifically, according to the embodiments of the present disclosure, the process described above with reference to the flowchart can be implemented as a computer software program. For example, the embodiments of the present disclosure include a computer program product including a computer program carried on a computer-readable medium, including program code for executing the method shown in the flowchart. In such embodiments, the computer program can be downloaded and installed from the network through the communication device 909, or installed from the storage device 908, or installed from the ROM 902. When the computer program is executed by the processing device 901, the above-mentioned functions defined in the method of the embodiments of the present disclosure are executed.

It should be noted that the computer-readable medium mentioned in this disclosure can be a computer-readable signal medium, a computer-readable storage medium, or any combination of the two. A computer-readable storage medium may be, but is not limited to, an electrical, magnetic, optical, electromagnetic, infrared, or semiconductor system, apparatus, or device, or any combination thereof. More specific examples of computer-readable storage medium may include, but are not limited to: an electrical connection with one or more wires, a portable computer disk, a hard drive, a random access memory (RAM), a read-only memory (ROM), an erasable programmable read-only memory (EPROM or flash), a fiber optic, a portable compact disk read-only memory (CD-ROM), an optical storage device, a magnetic storage device, or any suitable combination of the above. In this disclosure, a computer-readable storage medium may be any tangible medium containing or storing a program, which may be used by an instruction execution system, apparatus, or device, or in combination with it. In this disclosure, the computer-readable signal medium may include data signals propagated in the baseband or as part of the carrier wave, which carry computer-readable program code. This type of transmitted data signal can take various forms, including but not limited to electromagnetic signals, optical signals, or any suitable combination of the above. A computer-readable signal medium can also be any computer-readable medium other than a computer-readable storage medium, which can transmit, propagate, or transmit programs for use by instruction execution systems, devices, or devices, or in combination with them. The program code contained on computer-readable medium can be transmitted using any appropriate medium, including but not limited to wires, optical cables, RF (radio frequency), etc., or any suitable combination of the above.

The above-mentioned computer-readable medium may be included in the electronic device mentioned above; It can also exist separately without being assembled into the electronic device.

The above-mentioned computer-readable medium carries one or more programs, which, when executed by the electronic device, cause the electronic device to execute the method shown in the above embodiment.

Computer program code for executing the operations disclosed herein can be written in one or more programming languages or combinations thereof, including object-oriented programming languages such as Java, Smalltalk, C++, and conventional procedural programming languages such as C or similar programming languages. Program code can be completely executed on the user's computer, partially executed on the user's computer, executed as an independent software package, partially executed on the user's computer, partially executed on a remote computer, or completely executed on a remote computer or server. In cases involving remote computers, the remote computer can connect to the user's computer through any type of network, including a local area network (LAN) or wide area network (WAN), or can connect to an external computer (such as using an internet service provider to connect via the internet).

The flowchart and block diagram in the attached FIG. illustrate the possible architecture, functions, and operations of the system, methods, and computer program products according to various embodiments disclosed herein. At this point, each box in a flowchart or block diagram can represent a module, program segment, or part of code that contains one or more executable instructions for implementing a specified logical function. It should also be noted that in some alternative implementations, the functions indicated in the box can also occur in a different order than those indicated in the accompanying drawings. For example, two consecutive boxes can actually be executed in basic parallel, and sometimes they can also be executed in opposite order, depending on the functionality involved. It should also be noted that each box in the block diagram and/or flowchart, as well as the combination of boxes in the block diagram and/or flowchart, can be implemented using dedicated hardware based systems that perform specified functions or operations, or can be implemented using a combination of dedicated hardware and computer instructions.

The units described in the embodiments of the present disclosure can be implemented through software or hardware. The name of the unit does not constitute a qualification for the unit itself in some cases, for example, the first acquisition unit can also be described as "a unit that obtains at least two Internet protocol addresses.".

The functions described above in this article can be at least partially executed by one or more hardware logic components. For example, non-restrictive demonstration types of hardware logic components that can be used include: Field Programmable Gate Arrays (FPGAs), Application Specific Integrated Circuits (ASICs), Application Specific Standard Products (ASSPs), Systems on Chip (SOC), Complex Programmable Logic Devices (CPLDs), and so on.

In the context of this disclosure, machine readable medium may be tangible medium that may contain or store programs for use by or in combination with instruction execution systems, devices, or devices. Machine readable medium can be machine readable signal medium or machine readable storage medium. Machine readable medium may include but are not limited to electronic, magnetic, optical, electromagnetic, infrared, or semiconductor systems, devices, or devices, or any suitable combination of the above. More specific examples of machine readable storage medium may include electrical connections based on one or more lines, portable computer disks, hard drives, random access memory (RAM), read-only memory (ROM), erasable programmable read-only memory (EPROM or flash memory), optical fibers, compact disc read-only memory (CD-ROM), optical storage devices, magnetic storage devices, or any suitable combination of the above.

First, according to one or more embodiments of the present disclosure, a method of data processing is provided, which is applied to a cache node. The cache node includes at least one data storage unit, including:

receiving first access data transmitted by at least one client, the first access data representing an instruction log of a remote direct data read instruction transmitted by the client for target data cached in a non-uniform memory access structure; obtaining a data popularity of the target data based on the first access data, the data popularity representing a frequency of the target data accessed by the remote direct data read instruction; and based on the data popularity of the target data, caching the target data to a target location in a data storage unit implemented based on the non-uniform memory access structure, or migrating the target data out of the data storage unit, wherein the target location has a data read-write speed corresponding to the data popularity.

According to one or more embodiments of the disclosure, the first access data includes a first access number of the target data in a first time interval, the obtaining a data popularity of the target data based on the first access data includes: obtaining an average access number based on the first access number in the first time interval and a second access number in a second time interval, wherein the second time interval is prior to the first time interval; and obtaining the data popularity of the target data based on the average access number.

According to one or more embodiments of the present disclosure, the second time interval includes at least one historical subinterval, and the second access number includes an interval access number corresponding to each historical subinterval; the obtaining an average access number based on the first access number in the first time interval and a second access number in a second time interval includes: obtaining a corresponding weighting coefficient based on a historical moment corresponding to each historical subinterval, wherein the weighting coefficient is inversely proportional to a time distance from the historical moment to a current moment; calculating a weighted sum of the interval access number corresponding to each historical subinterval based on the weighting coefficient of each historical subinterval to obtain a weighted access number; and obtaining the average access number based on the weighted access number and the first access number.

According to one or more embodiments of the present disclosure, the caching the target data to a target location in a data storage unit implemented based on the non-uniform memory access structure based on the data popularity of the target data includes: determining a target access medium mounted by the data storage unit based on the data popularity of the target data, the target access medium having a data read-write speed corresponding to the data popularity; and caching the target data into the target access medium.

According to one or more embodiments of the present disclosure, the target access medium mounted by the data storage unit includes at least one of: a dynamic random access memory; a persistent memory located locally to the non-uniform memory access structure; a persistent memory located remotely from the non-uniform memory access structure; a solid state drive located locally to the non-uniform memory access structure; a solid state drive located remotely from the non-uniform memory access structure.

According to one or more embodiments of the present disclosure, in response to the target data being cached in the data storage unit, the method further includes: obtaining an average popularity of data cached in a first access medium, the first access medium being an access medium currently caching the target data; the caching the target data into the target access medium includes: in response to the data popularity of the target data being higher than the average popularity by a first threshold value, migrating the target data to the target access medium, wherein the first threshold value is determined based on at least a data amount of the target data.

According to one or more embodiments of the present disclosure, the method further includes, prior to caching the target data into the target access medium: obtaining a migration time consumption based on a data amount of the target data, the migration time consumption representing the time consumption for migrating the target data to the target access medium; the caching the target data into the target access medium includes: if the migration time consumption is less than a first time duration, caching the target data into the target access medium.

According to one or more embodiments of the present disclosure, the caching the target data into the target access medium includes: obtaining a data caching speed based on an operating load of the data storage unit; and caching the target data into the target access medium based on the data caching speed.

According to one or more embodiments of the present disclosure, in response to the target data being not cached in the data storage unit, the method further includes: obtaining a migrating-out time duration of the target data, the migrating-out time duration representing a lasting time of the target data being migrated out of the data storage unit; the caching the target data to a target location of the data storage unit based on the data popularity of the target data includes: in response to the migrating-out time duration being greater than a second time duration, caching the target data to the target location of the data storage unit.

According to one or more embodiments of the present disclosure, the first access data includes granularity information representing a classification granularity of the target data; and the method further includes: obtaining the data storage unit for caching the target data based on the granularity information.

According to one or more embodiments of the present disclosure, the method further includes at least one of: the first access data is generated based on a remote direct data access request or a remote procedure call request transmitted by the client to a cache node; the first access data includes at least one of: an identification of the cache node, an identification of the data storage unit, or an identification of an access medium mounted by the data storage unit.

Secondly, according to one or more embodiments disclosed herein, an apparatus of data processing is provided, including:
a receiving module configured to receive first access data transmitted by at least one client, the first access data representing an instruction log of a remote direct data read instruction transmitted by the client for target data cached in a non-uniform memory access structure;
a processing module configured to obtain a data popularity of the target data based on the first access data, the data popularity representing a frequency of the target data accessed by the remote direct data read instruction; and
a caching module configured to, based on the data popularity of the target data, cache the target data to a target location in a data storage unit implemented based on the non-uniform memory access structure, or migrating the target data out of the data storage unit, wherein the target location has a data read-write speed corresponding to the data popularity.

According to one or more embodiments of the present disclosure, the first access data includes a first access number of the target data in a first time interval, the processing module is specifically configured to: obtain an average access number based on the first access number in the first time interval and a second access number in a second time interval, wherein the second time interval is prior to the first time interval; and obtain the data popularity of the target data based on the average access number.

According to one or more embodiments of the present disclosure, the second time interval includes at least one historical subinterval, and the second access number includes an interval access number corresponding to each historical subinterval; when obtaining an average access number based on the first access number in the first time interval and a second access number in a second time interval includes, the processing module is specifically configured to: obtain a corresponding weighting coefficient based on a historical moment corresponding to each historical subinterval, wherein the weighting coefficient is inversely proportional to a time distance from the historical moment to a current moment; calculate a weighted sum of the interval access number corresponding to each historical subinterval based on the weighting coefficient of each historical subinterval to obtain a weighted access number; and obtain the average access number based on the weighted access number and the first access number.

According to one or more embodiments of the present disclosure, the caching module is specifically configured to: determine a target access medium mounted by the data storage unit based on the data popularity of the target data, the target access medium having a data read-write speed corresponding to the data popularity; and cache the target data into the target access medium.

According to one or more embodiments of the present disclosure, the target access medium mounted by the data storage unit includes at least one of: a dynamic random access memory; a persistent memory located locally to the non-uniform memory access structure; a persistent memory located remotely from the non-uniform memory access structure; a solid state drive located locally to the non-uniform memory access structure; a solid state drive located remotely from the non-uniform memory access structure.

According to one or more embodiments of the present disclosure, in response to the target data being cached in the data storage unit, the caching module is further configured to: obtain an average popularity of data cached in a first access medium, the first access medium being an access medium currently caching the target data; when caching the target data into the target access medium, the caching module is specifically configured to: in response to the data popularity of the target data being higher than the average popularity by a first threshold value, migrate the target data to the target access medium, wherein the first threshold value is determined based on at least a data amount of the target data.

According to one or more embodiments of the present disclosure, prior to caching the target data into the target access medium, the caching module is further configured to: obtaining a migration time consumption based on a data amount of the target data, the migration time consumption representing the time consumption for migrating the target data to the target access medium; when caching the target data into the target access medium, the caching module is specifically configured to: if the migration time consumption is less than a first time duration, cache the target data into the target access medium.

According to one or more embodiments of the present disclosure, the caching module is specifically configured to: obtain a data caching speed based on an operating load of the data storage unit; and cache the target data into the target access medium based on the data caching speed.

According to one or more embodiments of the disclosure, in response to the target data being not cached in the data storage unit, the caching module is further configured to: obtain a migrating-out time duration of the target data, the migrating-out time duration representing a lasting time of the target data being migrated out of the data storage unit; the caching module is specifically configured to: in response to the migrating-out time duration being greater than a second time duration, cache the target data to the target location of the data storage unit.

According to one or more embodiments of the present disclosure, the first access data includes granularity information representing a classification granularity of the target data; and the processing module is further configured to: obtain the data storage unit for caching the target data based on the granularity information.

According to one or more embodiments of the present disclosure, the apparatus further includes at least one of: the first access data is generated based on a remote direct data access request or a remote procedure call request transmitted by the client to a cache node; the first access data includes at least one of: an identification of the cache node, an identification of the data storage unit, or an identification of an access medium mounted by the data storage unit.

Thirdly, according to one or more embodiments disclosed herein, there is provided an electronic device, including: a processor, and a memory communicatively coupled to the processor;
wherein the memory stores computer-executable instructions; and
the processor executes the computer-executable instructions stored by the memory to carry out the method of data processing of the first aspect and various possible designs of the first aspect.

Fourth, according to one or more embodiments of the present disclosure, there is provided a computer-readable storage medium having computer-executable instructions stored thereon, which, when executed by a processor, carry out the method of data processing of the first aspect and various possible designs of the first aspect.

Fifth, the embodiments of the present disclosure provide a computer program product including a computer program which, when executed by a processor, carries out the method of data processing of the first aspect and various possible designs of the first aspect The above description is only for the preferred embodiments of the present disclosure and an explanation of the technical principles used. Technicians in this field should understand that the scope of disclosure referred to in this disclosure is not limited to technical solutions formed by specific combinations of the aforementioned technical features, and should also cover other technical solutions formed by arbitrary combinations of the aforementioned technical features or their equivalent features without departing from the disclosed concept. For example, a technical solution formed by replacing the above features with (but not limited to) technical features with similar functions of the present disclosure.

Furthermore, although the operations are depicted in a specific order, this should not be understood as requiring them to be executed in the specific order shown or in sequential order. In certain environments, multitasking and parallel processing may be advantageous. Similarly, although several specific implementation details are included in the above discussion, these should not be interpreted as limitations on the scope of this disclosure. Some features described in the context of individual embodiments can also be combined to be implemented in a single embodiment. On the contrary, various features described in the context of a single embodiment can also be implemented separately or in any suitable sub combination in a plurality of embodiments.

Although the subject matter has been described in language specific to structural features and/or method logical actions, it should be understood that the subject matter limited in the attached claims may not necessarily be limited to the specific features or actions described above. On the contrary, the specific features and actions described above are only example forms of implementing the claims.

The invention claimed is:

1. A method of data processing, comprising:
receiving first access data transmitted by at least one client, the first access data representing an instruction log of a remote direct data read instruction transmitted by the client for target data cached in a non-uniform memory access structure;
obtaining a data popularity of the target data based on the first access data, the data popularity representing a frequency of the target data accessed by the remote direct data read instruction;
based on the data popularity of the target data, caching the target data to a target location in a data storage unit implemented based on the non-uniform memory access structure, or migrating the target data out of the data storage unit, wherein the target location has a data read-write speed corresponding to the data popularity; and
in response to the target data being not cached in the data storage unit, obtaining a migrating-out time duration of the target data, wherein
the caching the target data to a target location of the data storage unit based on the data popularity of the target data comprises:
in response to the migrating-out time duration being greater than a second time duration, caching the target data to the target location of the data storage unit.

2. The method of claim 1, wherein
the first access data comprises a first access number of the target data in a first time interval, and
the obtaining a data popularity of the target data based on the first access data comprises:
obtaining an average access number based on the first access number in the first time interval and a second access number in a second time interval, wherein the second time interval is prior to the first time interval; and obtaining the data popularity of the target data based on the average access number.

3. The method of claim 2, wherein the second time interval comprises at least one historical subinterval, and the second access number comprises an interval access number corresponding to each historical subinterval; the obtaining an average access number based on the first access number in the first time interval and a second access number in a second time interval comprises:

obtaining a corresponding weighting coefficient based on a historical moment corresponding to each historical subinterval, wherein the weighting coefficient is inversely proportional to a time distance from the historical moment to a current moment;

calculating a weighted sum of the interval access number corresponding to each historical subinterval based on the weighting coefficient of each historical subinterval to obtain a weighted access number; and obtaining the average access number based on the weighted access number and the first access number.

4. The method of claim 1, wherein the caching the target data to a target location in a data storage unit implemented based on the non-uniform memory access structure based on the data popularity of the target data comprises:

determining a target access medium mounted by the data storage unit based on the data popularity of the target data, the target access medium having a data read-write speed corresponding to the data popularity; and caching the target data into the target access medium.

5. The method of claim 4, wherein the target access medium mounted by the data storage unit comprises at least one of:

a dynamic random access memory;
a persistent memory located locally to the non-uniform memory access structure;
a persistent memory located remotely from the non-uniform memory access structure;
a solid state drive located locally to the non-uniform memory access structure; and
a solid state drive located remotely from the non-uniform memory access structure.

6. The method of claim 4, wherein
in response to the target data being cached in the data storage unit, the method further comprises:
obtaining an average popularity of data cached in a first access medium, the first access medium being an access medium currently caching the target data; and
the caching the target data into the target access medium comprises:
in response to the data popularity of the target data being higher than the average popularity by a first threshold value, migrating the target data to the target access medium, wherein the first threshold value is determined based on at least a data amount of the target data.

7. The method of claim 4, further comprising, prior to caching the target data into the target access medium:
obtaining a migration time consumption based on a data amount of the target data, the migration time consumption representing the time consumption for migrating the target data to the target access medium, wherein the caching the target data into the target access medium comprises:

if the migration time consumption is less than a first time duration, caching the target data into the target access medium.

8. The method of claim 4, wherein the caching the target data into the target access medium comprises:
obtaining a data caching speed based on an operating load of the data storage unit; and
caching the target data into the target access medium based on the data caching speed.

9. The method of claim 1, wherein the migrating-out time duration represents a lasting time of the target data migrating out of the data storage unit.

10. The method of claim 1, wherein
the first access data comprises granularity information representing a classification granularity of the target data, and
the method further comprises obtaining the data storage unit for caching the target data based on the granularity information.

11. The method of claim 1, wherein
the first access data is generated based on a request, the request being at least one of a remote direct data access request or a remote procedure call request transmitted by the client to a cache node, and
the first access data comprises at least one of an identification of the cache node, an identification of the data storage unit, or an identification of an access medium mounted by the data storage unit.

12. An electronic device, comprising:
a processor; and
a memory communicatively coupled to the processor and storing computer-executable instructions, wherein
the processor is configured to execute the computer-executable instructions stored by the memory to carry out a method of data processing, the method comprising:
receiving first access data transmitted by at least one client, the first access data representing an instruction log of a remote direct data read instruction transmitted by the client for target data cached in a non-uniform memory access structure;
obtaining a data popularity of the target data based on the first access data, the data popularity representing a frequency of the target data accessed by the remote direct data read instruction;
based on the data popularity of the target data, caching the target data to a target location in a data storage unit implemented based on the non-uniform memory access structure, or migrating the target data out of the data storage unit, wherein the target location has a data read-write speed corresponding to the data popularity; and
in response to the target data being not cached in the data storage unit, obtaining a migrating-out time duration of the target data, wherein
the caching the target data to a target location of the data storage unit based on the data popularity of the target data comprises:
in response to the migrating-out time duration being greater than a second time duration, caching the target data to the target location of the data storage unit.

13. The electronic device of claim 12, wherein
the first access data comprises a first access number of the target data in a first time interval, and
the obtaining a data popularity of the target data based on the first access data comprises:

obtaining an average access number based on the first access number in the first time interval and a second access number in a second time interval, wherein the second time interval is prior to the first time interval; and obtaining the data popularity of the target data based on the average access number.

14. The electronic device of claim 13, wherein
the second time interval comprises at least one historical subinterval, and the second access number comprises an interval access number corresponding to each historical subinterval, and the obtaining an average access number based on the first access number in the first time interval and a second access number in a second time interval comprises:

obtaining a corresponding weighting coefficient based on a historical moment corresponding to each historical subinterval, wherein the weighting coefficient is inversely proportional to a time distance from the historical moment to a current moment;

calculating a weighted sum of the interval access number corresponding to each historical subinterval based on the weighting coefficient of each historical subinterval to obtain a weighted access number; and obtaining the average access number based on the weighted access number and the first access number.

15. The electronic device of claim 12, wherein the caching the target data to a target location in a data storage unit implemented based on the non-uniform memory access structure based on the data popularity of the target data comprises:

determining a target access medium mounted by the data storage unit based on the data popularity of the target data, the target access medium having a data read-write speed corresponding to the data popularity; and caching the target data into the target access medium.

16. The electronic device of claim 15, wherein the target access medium mounted by the data storage unit comprises at least one of:

a dynamic random access memory;

a persistent memory located locally to the non-uniform memory access structure;

a persistent memory located remotely from the non-uniform memory access structure;

a solid state drive located locally to the non-uniform memory access structure; and a solid state drive located remotely from the non-uniform memory access structure.

17. The electronic device of claim 15, wherein
in response to the target data being cached in the data storage unit, the method further comprises:

obtaining an average popularity of data cached in a first access medium, the first access medium being an access medium currently caching the target data; and the caching the target data into the target access medium comprises:

in response to the data popularity of the target data being higher than the average popularity by a first threshold value, migrating the target data to the target access medium, wherein the first threshold value is determined based on at least a data amount of the target data.

18. The electronic device of claim 15, wherein
the method further comprises, prior to caching the target data into the target access medium:

obtaining a migration time consumption based on a data amount of the target data, the migration time consumption representing the time consumption for migrating the target data to the target access medium, and the caching the target data into the target access medium comprises:

if the migration time consumption is less than a first time duration, caching the target data into the target access medium.

19. The electronic device of claim 15, wherein the caching the target data into the target access medium comprises:

obtaining a data caching speed based on an operating load of the data storage unit; and caching the target data into the target access medium based on the data caching speed.

20. A non-transitory computer-readable storage medium having computer-executable instructions stored thereon, which, when executed by a processor, carry out a method of data processing, the method comprising:

receiving first access data transmitted by at least one client, the first access data representing an instruction log of a remote direct data read instruction transmitted by the client for target data cached in a non-uniform memory access structure;

obtaining a data popularity of the target data based on the first access data, the data popularity representing a frequency of the target data accessed by the remote direct data read instruction;

based on the data popularity of the target data, caching the target data to a target location in a data storage unit implemented based on the non-uniform memory access structure, or migrating the target data out of the data storage unit, wherein the target location has a data read-write speed corresponding to the data popularity; and in response to the target data being not cached in the data storage unit, obtaining a migrating-out time duration of the target data, wherein the caching the target data to a target location of the data storage unit based on the data popularity of the target data comprises:

in response to the migrating-out time duration being greater than a second time duration, caching the target data to the target location of the data storage unit.

* * * * *